United States Patent [19]

Kurth

[11] Patent Number: 4,853,787

[45] Date of Patent: Aug. 1, 1989

[54] STILL VIDEO CAMERA HAVING A VIEWFINDER WITH SUPERIMPOSED IMAGES

[75] Inventor: Guenther V. Kurth, Scottsville, N.Y.

[73] Assignee: Eastman Kodak Company, Rochester, N.Y.

[21] Appl. No.: 240,302

[22] Filed: Sep. 6, 1988

[51] Int. Cl.⁴ .......................... G03B 7/08; H04N 5/30
[52] U.S. Cl. .................................. 358/224; 358/909; 354/478
[58] Field of Search ............. 358/909, 213.17, 213.15, 358/224, 209; 354/476, 478

[56] References Cited

U.S. PATENT DOCUMENTS

| | | | |
|---|---|---|---|
| 4,128,321 | 12/1978 | Kobori et al. | 354/478 |
| 4,303,322 | 12/1981 | Someya | 354/31 |
| 4,420,773 | 12/1983 | Toyoda et al. | 358/335 |
| 4,481,539 | 11/1984 | Meise et al. | 358/213.17 |
| 4,524,390 | 6/1985 | Lemke | 358/213.17 |

Primary Examiner—Jin F. Ng
Assistant Examiner—Stephen Brinich
Attorney, Agent, or Firm—John B. Turner

[57] ABSTRACT

A still video camera in which the image-forming beam from an objective lens is split by a beamsplitter and the same image is centered on two solid state image sensors. The images on the sensors are visible and are combined by the beamsplitter and viewed through a viewfinder.

2 Claims, 3 Drawing Sheets

STILL VIDEO CAMERA HAVING A VIEWFINDER WITH SUPERIMPOSED IMAGES

BACKGROUND OF THE INVENTION

1. Field of the Invention

This invention relates to electronic still cameras.

2. Description Relative to the Prior Art

U.S. Pat. No. 4,420,773 discloses an electronic photographic camera which has an objective lens which focuses an image onto a sensor. The camera has a separate optical viewfinder. The separate viewfinder has the disadvantages known to exist in relation to separate viewfinders in conventional, silver halide cameras. Such disadvantages include parallax and inability to determine either the state of focus of the image or the boundaries of the image to be recorded when using a zoom lens.

SUMMARY OF THE INVENTION

It is an object of the present invention to overcome the disadvantages of the prior art.

The object of the present invention is achieved in an electronic camera in accordance with the present invention. An electronic camera in accordance with the present invention includes means for mounting an objective lens for creating an image of an object and a beamsplitter disposed to split the beam transmitted by a lens mounted in the mounting means, into a transmitted beam and a reflected beam. There is a first solid state image sensor disposed in the focal plane of the transmitted beam and a second solid state image sensor disposed in the focal plane of the reflected beam. The camera also includes a viewfinder and means for directing both light reflected by the first solid state image sensor and by the beam splitter, and light reflected by the second solid state image sensor and transmitted by the beamsplitter into said viewfinder whereby the two images viewed through the viewfinder are superimposed. There are means for preventing ambient light outside the viewfinder entering the camera through the viewfinder during the capture of the electrical analogs of optical images on the sensors, which analogs are to be read for recreation of a desired image.

BRIEF DESCRIPTION OF THE DRAWINGS

Embodiments of the present invention will now be described, by way of example, with reference to the accompanying drawings, in which.

DETAILED DESCRIPTION OF THE PREFERRED EMBODIMENT

Figure 1:
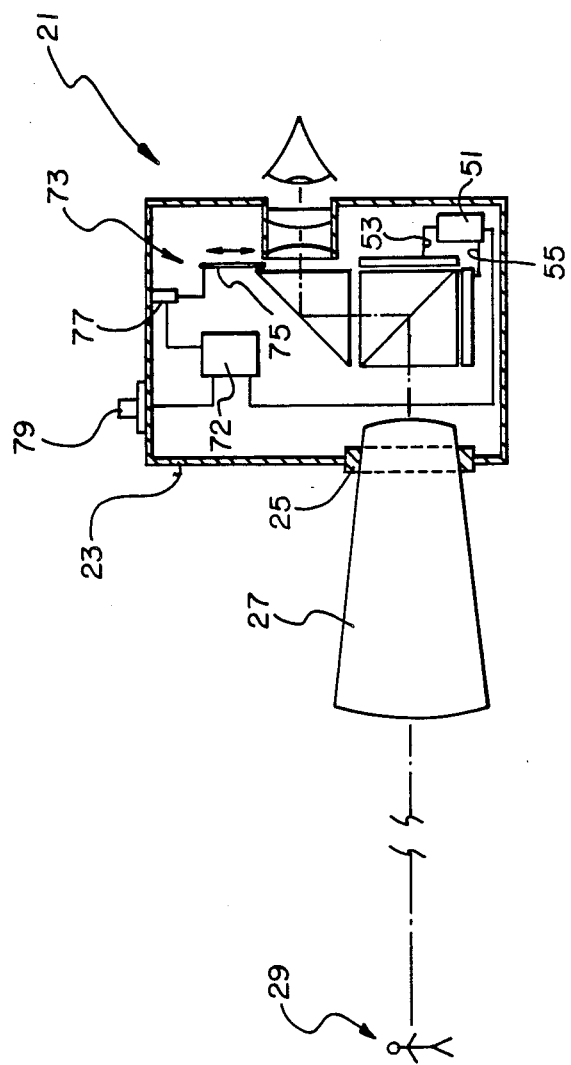
FIG. 1 is a diagrammatic representation of an electronic camera embodying the present invention.
Figure 2:
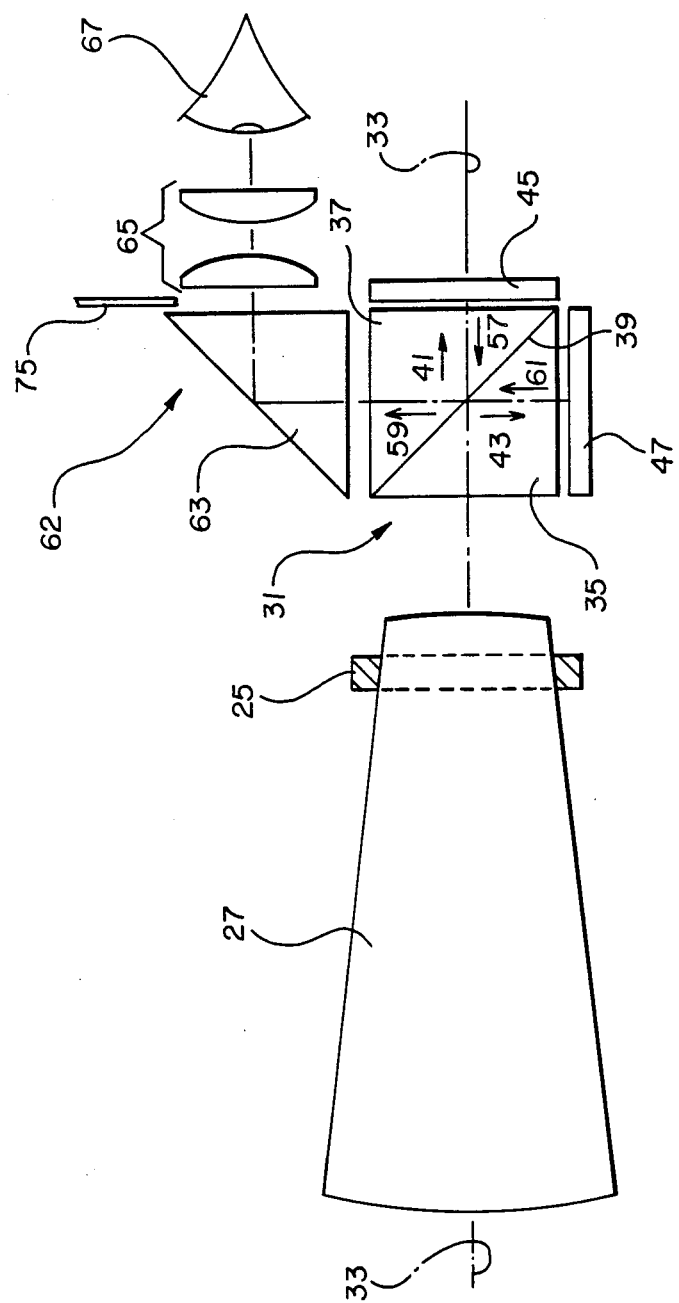
FIG. 2 diagrammatically represents the optical system of the embodiment illustrated in FIG. 1, but on an enlarged scale.

An electronic camera 21, embodying the present invention, is diagrammatically represented in FIG. 1. The optical system of the camera is illustrated on an enlarged scale in FIG. 2. The camera 21 includes a light-tight housing 23 having means 25 for mounting an objective lens 27 for forming an image of an object 29. The lens mounting means 25 may take any known form such as screw threads or a bayonet fitting. The lens 27 has an axis 33 (see FIG. 2).

Supported within the housing, in a position to intercept a beam transmitted by the lens 27, is a beamsplitter 31. The beamsplitter 31 is of known form and comprises two prisms 35 and 37 cemented together with a partially reflective layer 39 at their interface. The beamsplitter 31 serves to split the beam transmitted by the lens 27 into a transmitted beam directed in the general direction 41 and a reflected beam directed in the general direction 43. The transmitted beam exits the prism 37 and is incident on a first solid state image sensor 45. The reflected beam exits the prism 35 and is incident on a second solid state image sensor 47. The first and second image sensors 45 and 47, respectively, are disposed in the focal planes of the transmitted and reflected beams, respectively. Thus, the optical system is such as to create images of the object 29 on the sensors 45, 47. The sensors provide electrical analogs of the optical images created on them. The sensors 45, 47 are sensitive to different portions of the spectrum so that the analogs together describe a color image. Electrical signals are sent from the sensors to a memory 51 along conductors 53 and 55, respectively The sensor 45 is perpendicular to the axis 33 and the sensor 47 is perpendicular to the axis 33 as folded be the reflective surface 39.

The sensors 45, 47 on which the images are formed may reflect 80% or more of the light incident on them and the images are visible on them. Light reflected by the sensor 45 is directed in the general direction 57, which is opposite to the direction 41, and is incident on the partially reflective layer 39. The layer 39 transmits some of the light reflected by the sensor 45 and reflects at least some of the rest of the reflected light. The light which is reflected by the layer 39 (having previously been reflected by the sensor 45), is directed in the general direction 59.

Light reflected by the sensor 47 is directed in the general direction 61 which is opposite to the direction 43, and is incident on the reflected layer 39. The layer 39 reflects some of the light reflected by the sensor 47 and which is directed in general direction 57, and transmits at least some of the remainder of the light reflected by the sensor 47. The light which is transmitted by the layer 39, having previously been reflected by the sensor 47, is directed in the general direction 59.

Both the light reflected by the layer 39 and the light transmitted by the layer 39, which is directed in the general direction 59, exits the prism 37 and is directed into a viewfinder 62. Thus, it will be understood that the partially reflective layer 39 forms means for directing light from the images on the sensors into the viewfinder. The light directed into the viewfinder 62 is incident on a prism 63. The prism 63 is a 90° roof prism and turns the beam which exited the prism 37, through 90° so that it exits the prism 63 generally parallel to the axis 33 of the lens 27. The beam leaving the prism 63 passes through an eye lens 65 and exits the viewfinder 62 and is then incident on an eye 67 of a photographer using the camera 21. It will be recognized that because of the dispositions of the sensors 45 and 47 perpendicular to the axis 33, both folded and unfolded, and at the same image distance, the two images when viewed through the viewfinder are superimposed and of the same size and appear to be one.

The camera also includes means 73 for preventing ambient light outside the viewfinder 62 from entering the camera during the capture of an image. The preventing means 73 includes a movable baffle 75 disposed to block flow of light from the eye lens 65 to the prism 63, when in a blocking position, during the 'taking' of a photograph and to allow flow of light from the prism 63 to the eye lens 65, when in a passing position, during the composing of an image. The baffle 75 is shown in the passing position in FIGS. 1 and 2. The baffle 75 is driven between positions by drive means 77 controlled by control means 72.

The control means also control an electrical gate in the memory 51 which allows signals to flow from the sensors 45 and 47 and be captured in the memory. Thus, the gate is similar to the shutter which controls flow of light from the lens to the silver halide film in a conventional camera for capturing a latent image in the silver halide. The analogs in the memory may be read subsequently for recreation of the captured image.

The control means 72 are under the control of a release button 79 which has two stages. When the button 79 is partially depressed, it sends a first signal to the control means 72. When the button is fully depressed it sends a second signal to the control means 72. When the control means receives the first signal, it causes the drive means 77 to move the baffle to a position in which it blocks flow of ambient light into the camera through the viewfinder 62. When the control means 72 receives the second signal, resulting from full depression of the button 79, it causes the gate in the memory 51 to allow signals from the sensors 45 and 47 to be stored. Upon release of the button 79, the control means causes the drive means 77 to move the baffle to the passing position so that another photograph can be composed.

The camera may include other features, such as, for example, an iris for controlling the brightness of the images formed on the sensors 45 and 47 and automatic focussing, both of which may be controlled by the control means 72. In this way, composing of the image may be performed with maximum brightness of the image on the sensors, with stopping down occurring immediately prior to the taking of a photograph. Also, focussing may be initiated by a signal from the button 79 prior to the above-mentioned first signal which causes the baffle 75 to move into the blocking position.

Figure 3:
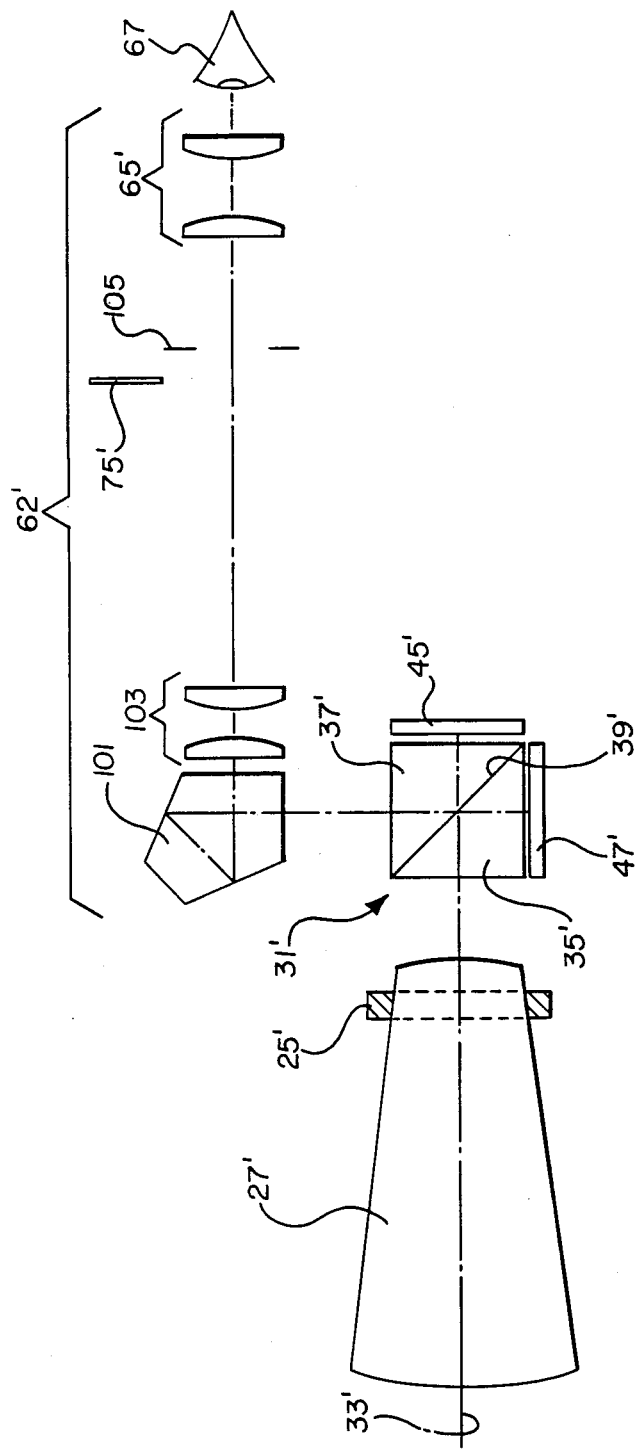
FIG. 3 is similar to FIG. 2, but illustrates the optical system of a second embodiment of the present invention.

The optics of a second embodiment of the present invention are diagrammatically illustrated in FIG. 3. Parts similar to parts in the first-described embodiment are given the same reference numeral but with the addition of a prime (') suffix. Only those features of the second embodiment which differ from the first embodiment will now be described. For an understanding of the remainder of the camera, reference should be made to the above description.

In the second embodiment, light exiting the beamsplitter 31' is incident on a penta prism 101. The inclusion of a penta prisma, instead of the roof prism of the first embodiment, necessitates the inclusion of an erector 103 in the viewfinder, so that the image viewed by eye 67' may be erect. In this embodiment the viewfinder 62' includes a field stop 105 and the baffle 75' is located adjacent the field stop 105.

The invention has been described in detail with particular reference to a presently preferred embodiment, but it will be understood that variations and modifications can be effected within the spirit and scope of the invention.

What is claimed is:

1. An electronic camera including:

means for mounting an objective lens for creating an image of an object;

a beamsplitter disposed to split the beam transmitted by a lens mounted in the mounting means into a transmitted beam and a reflected beam;

first solid state image sensor means disposed in the focal plane of the transmitted beam and for creating an electrical analog of the optical image on the first sensor means;

second solid state image sensor means disposed in the focal plane of the reflected beam and for creating an electrical analog of the optical image on the second sensor means;

a view finder;

means for directing light reflected by the first solid state image sensor and by the beamsplitter, and light reflected by the second solid state image sensor and transmitted by the beamsplitter, into said viewfinder, whereby the two images viewed through said viewfinder are superimposed;

means for capturing the electrical analogs of the optical images; and means for preventing ambient light outside the viewfinder entering the camera through the viewfinder during the capture of the electrical analogs of optical images on the first and second sensor means, which analogs are to be read for recreation of a desired image.

2. An electronic camera as claimed in claim 1, wherein said means for directing light reflected by the sensors into said viewfinder is formed at least in part by said beamsplitter.

* * * * *